(12) United States Patent
Monti

(10) Patent No.: US 7,743,904 B2
(45) Date of Patent: Jun. 29, 2010

(54) DEVICE FOR INDIVIDUAL CONVEYING OF ELONGATE ARTICLES

(75) Inventor: Giuseppe Monti, Pianoro (IT)

(73) Assignee: Marchesini Group S.p.A., Planoro (Bologna) (IT)

( * ) Notice: Subject to any disclaimer, the term of this patent is extended or adjusted under 35 U.S.C. 154(b) by 0 days.

(21) Appl. No.: 12/391,300

(22) Filed: Feb. 24, 2009

(65) Prior Publication Data

US 2009/0229951 A1 Sep. 17, 2009

(30) Foreign Application Priority Data

Mar. 14, 2008 (IT) .......................... BO2008A0166

(51) Int. Cl.
*B65G 47/14* (2006.01)
(52) U.S. Cl. .................. 198/396; 198/395; 198/397.01
(58) Field of Classification Search ................. 198/395, 198/396, 397.01, 397.06, 443, 444
See application file for complete search history.

(56) References Cited

U.S. PATENT DOCUMENTS

| | | | | |
|---|---|---|---|---|
| 3,392,815 A | * | 7/1968 | Skeels, Sr. et al. | 198/397.06 |
| 3,624,773 A | * | 11/1971 | Krooss | 198/397.01 |
| 3,658,167 A | * | 4/1972 | Zabroski et al. | 198/397.06 |
| 3,835,985 A | * | 9/1974 | Johnson | 198/397.06 |
| 4,651,864 A | * | 3/1987 | Nipoti et al. | 198/397.01 |
| 5,236,077 A | | 8/1993 | Hoppmann et al. | |
| 6,401,906 B1 | * | 6/2002 | Franz et al. | 198/397.06 |
| 7,228,955 B2 | * | 6/2007 | Comas | 198/527 |

FOREIGN PATENT DOCUMENTS

| | | |
|---|---|---|
| DE | 3718481 A | 12/1988 |
| DE | 10133805 A | 1/2003 |
| FR | 2571705 A | 4/1986 |

* cited by examiner

*Primary Examiner*—James R Bidwell
(74) *Attorney, Agent, or Firm*—William J. Sapone; Coleman Sudol Sapone P.C.

(57) ABSTRACT

The device for individual conveying of elongate objects comprises: a hopper from which batches of elongate articles are extracted, which fall onto an initial tract of a conveyor belt provided with transversal seatings. The belt draws the articles towards a strongly-inclined ascending tract, along which all the articles which are not correctly inserted in the seatings are unloading. After the ascending tract thereof follows an intermediate tract, superiorly of which a television camera is arranged to monitor the transversal seatings as they transit, in order to detect each of the a presence or absence of articles and if there should be any present, a number, position and orientation thereof. In a final tract, robotic manipulating organs are provided, controlled by the television camera which remove from each of the transversal seatings full on arrival, at least one of the articles, on the basis of the coordinates provided by the vision camera, in order to transfer the article to an output position downstream, in a predetermined orientation thereof. The device further comprises a device for collecting and returning to the hopper the elongate articles not removed by the robotic organs and unloading from the conveyor belt beyond the final tract thereof.

13 Claims, 5 Drawing Sheets

DEVICE FOR INDIVIDUAL CONVEYING OF ELONGATE ARTICLES

BACKGROUND OF THE INVENTION

The invention relates to the technical sector of packing of articles, with special reference to those devices which collect the articles from a storage container in which they are loosely arranged, and feeds them to a station in which gripping organs are located which remove them individually and transfer them, for example, to an input line of an automatic machine.

The prior art dealing with such devices comprises many and various technical solutions, each of which is aimed at satisfying specific needs, according to the shape of the articles destined to be treated.

For the present purposes elongate articles are considered, which are to be fed to an automatic machine arranged downstream of the device, with a predetermined position and orientation.

A known solution for collection of elongate articles, known as a slat conveyor, comprises a first conveyor the initial part of which is immersed in the pile of loose articles and develops in an upwards direction; the first conveyor is constituted by a sort of escalator in which each step is activated with alternating ascending and descending motion, in suitable phase-relation to the others; when two consecutive steps are in the respective higher and lower position, they are aligned and the article borne on the lower step transfers by force of gravity to the upper step, thanks to a special inclination of the "tread" of the steps; the articles, therefore, progressively ascend all the steps and are unloaded onto a second conveyor which develops horizontally and perpendicularly with respect to the output of the articles from the first conveyor.

Means for detecting the position of the articles are located in the second conveyor and downstream of the means for detecting are located the gripping organs of the single articles.

The drawbacks of the above-described constructional solution regard firstly the complexity of the mechanism required to realize the first conveyor and, secondly, a certain frequency of malfunctioning due to the fact that because of the passage between the first and the second conveyor, the positions of the articles on them are very uncertain and subject to faulty conditions, such as, for example, piling up and/or one article lying over another.

A further drawback of the known solution relates to the difficulty of changing format for the first conveyor, due to the dimensional constraint between the depth of the steps and the transversal dimension of the articles.

SUMMARY OF THE INVENTION

The aim of the present invention is thus to realize a device conformed expressly for individually conveying elongate articles towards a downstream position, such as to make sure the articles remain in the correct predetermined position and orientation.

A further aim of the invention consists in providing a device which can over a defined period of time feed a higher-than-required number of articles to the packing station.

A further aim of the invention relates to the desire to provide a device conformed in such a way as to collect the articles supplied in excess at the output such that they can be returned to the work cycle at the input of the device.

A further aim of the invention is to provide a device in which the replacement of the transversal separator elements, which relate one-by one to different formats, is particularly easy, while also limiting the number required thereof.

A still further aim of the invention regards the intention to realize a device of simple construction and certain reliability.

The aforementioned aims are achieved by means of a device for individual conveying of elongate objects, which comprises: a hopper for loosely containing the elongate articles; means for picking-up located at a lower mouth of the hopper, for supporting a pile of the elongate articles as well as being step-activated in order to extract batches of the articles from the hopper; a conveyor belt, in which a plurality of specially-dimensioned transversal seatings are afforded, which conveyor belt is ring-wound to define two consecutive branches, respectively an operative upper branch and a return lower branch, the upper branch comprising an initial tract, substantially horizontal, arranged at an input station underlying the hopper and destined to restingly receive the articles which come from the hopper, an ascending tract, wherein each transversal seating conveys at least an elongate article, arranged in a predetermined orientation, and each seating does not retain the elongate articles exceeding a maximum number and any wrongly-arranged articles, which elongate articles exceeding a maximum number and the any wrongly article drop into the input station, an intermediate tract and a final tract, situated at an unloading station of the elongate articles; sensor organs located in the input station, for detecting a minimum load level of the elongate articles and for enabling the step-activation of the means for picking-up; optical detecting organs, arranged superiorly of the intermediate tract, for detecting in each of the transversal seating a presence or absence of elongate articles and if a presence thereof has been detected, detecting a number, a position and an orientation of the elongate articles; robotic manipulating organs located at the unloading station above the final tract of the operative upper branch, controlled by the optical detecting organs, for picking-up from each full transversal seating in arrival at least one elongate article on a basis of coordinates provided by the optical detecting organs, in order to transfer the elongate article to an output position downstream, with a predetermined orientation; means for collecting the elongate articles not picked-up by the robotic manipulating organs and unloaded by the conveyor belt beyond the final tract of the operative upper branch.

BRIEF DESCRIPTION OF THE DRAWINGS

The characteristics of the invention will become more evident in the following description of a preferred embodiment of the device, according to what is reported in the claims and with the aid of the accompanying figures of the drawings, in which:

DESCRIPTION OF THE PREFERRED EMBODIMENTS

With reference to the figures of the drawings, 1 denotes the device of the invention in its entirety.

The device 1 is destined to deal with elongate articles 2 which might have two identical ends or different ends, such as for example syringes, tubes for medicine and the like, and a constant section or a section which is variable from an end to another.

Figure 5:
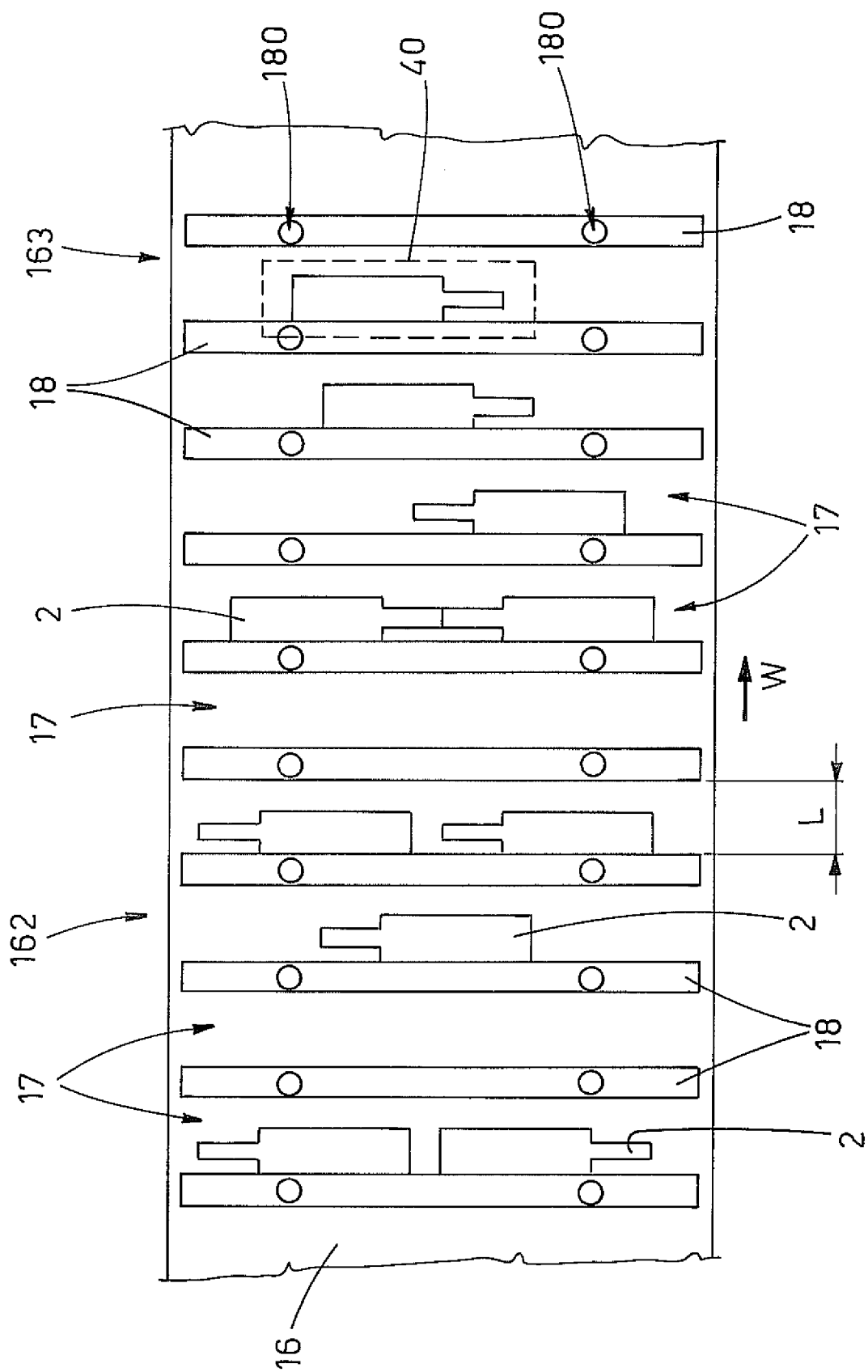
FIG. 5 is a plan view of a portion of conveyor belt in an operating condition.

In the example illustrated in FIG. 5, the condition considered is one in which the two ends of the articles 2 are different, with the need, therefore, to guarantee a precise orientation thereof, at the output of the device 1.

Figure 1:
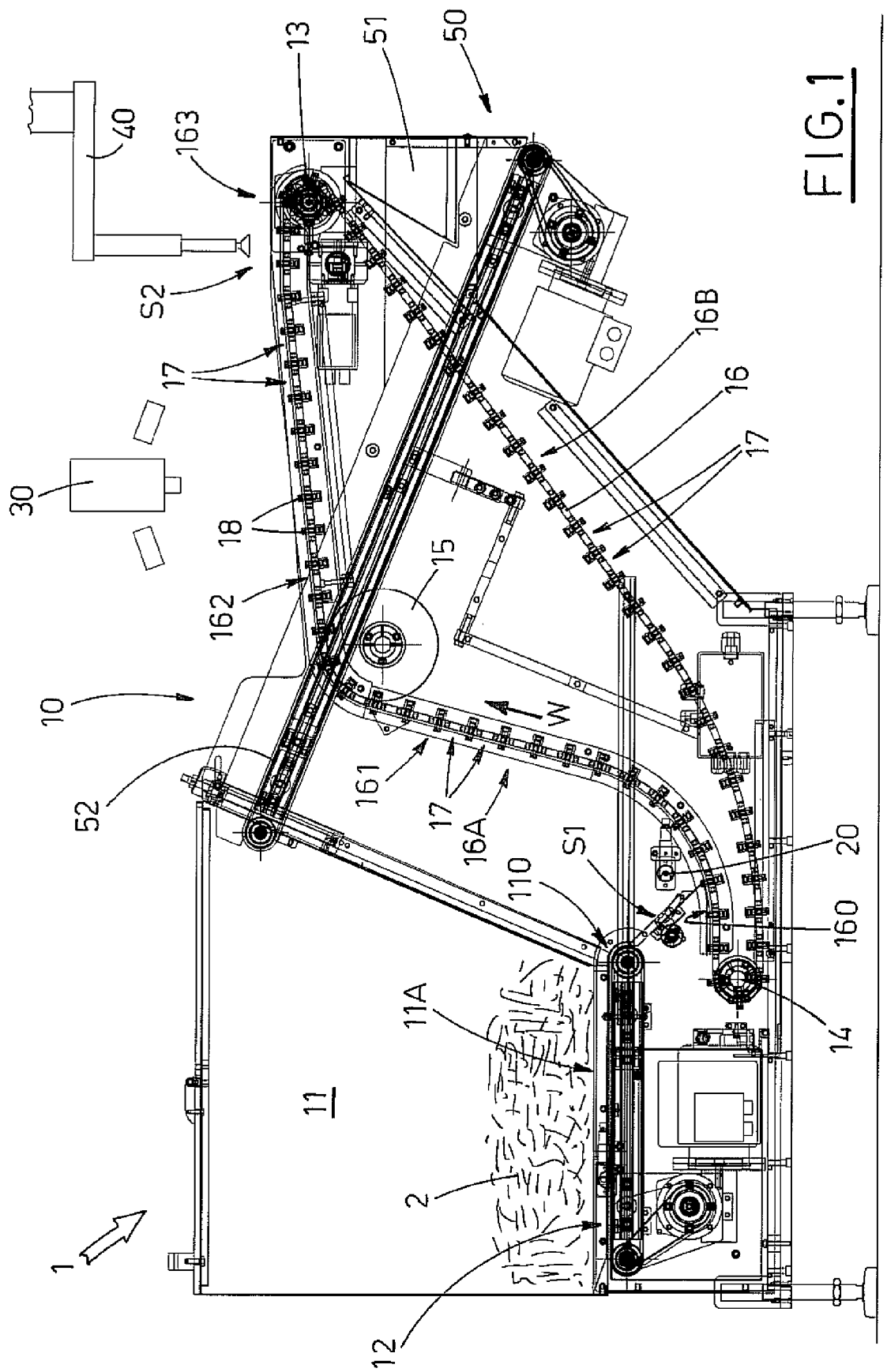
FIG. 1 is a lateral view, with some parts sectioned, of the device of the invention.

The device 1 comprises a main body 10 in which a hopper 11 is realized (FIGS. 1 and 2) destined to contain the elongate articles 2 (FIGS. 1 and 5).

The hopper 11 is open at a lower mouth thereof 11A and lies above means for picking-up 12, which support the pile of the elongate articles 2.

In the example of FIG. 1, the means for picking-up 12 are constituted by a conveyor belt, designed to be step-activated to extract batches of the articles 2, directing them towards a slit 110 afforded laterally in the hopper 11, as will be better described herein below.

The main body 10 supports the drive roller 13 and the driven rollers 14, 15 on which a conveyor belt 16 is ring-wound, in an outwards-facing surface of which a plurality of transversal seatings 17 of specific dimensions are delimited (FIG. 1).

Each seating 17 is identified in a space between two consecutive laths 18, arranged transversally of the belt 16 and removably associated to the belt by means of a rapid attachment 180 (FIGS. 1 and 5).

The laths 18 can exhibit a section of various forms and sizes, according to the article 2 to which they are destined for use.

The width L of each transversal seating 17, in a parallel direction to the development of the belt 16, is such as to enable the seating 17 to house one alone of the elongate articles 2 along the direction; this is due to the fact that the size of the width L is less than double the maximum width of the elongate articles 2 (FIG. 5).

In a preferred embodiment, the means for rapid attachment 180 are constituted by at least two metal pins 181, parallel to one another and made solid to a lower side of each lath 18, destined to insert in complementarily-shaped niches 182 afforded in the conveyor belt 16; each pair of niches 182 is distanced from adjacent niches according to the development direction of the belt 16, with a constant step.

Figure 4A:
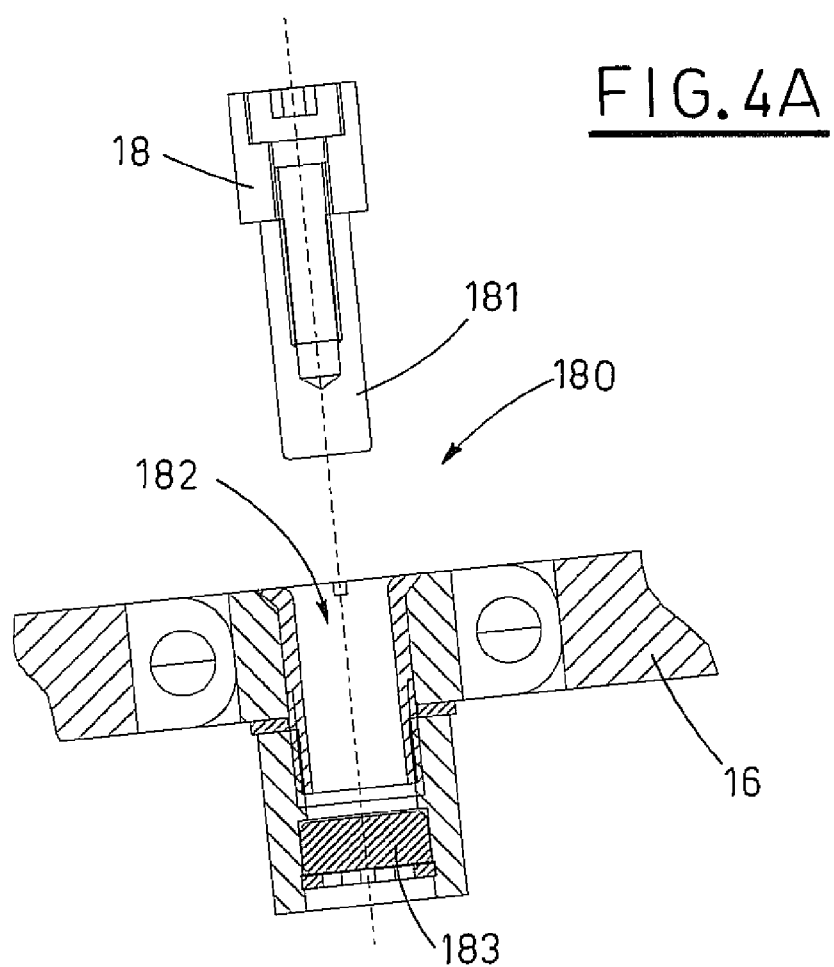
FIG. 4A is an enlarged-scale illustration of the detail K of FIG. 3A, with an exploded view of a shaped element to be coupled with a seating of the belt.
Figure 4B:
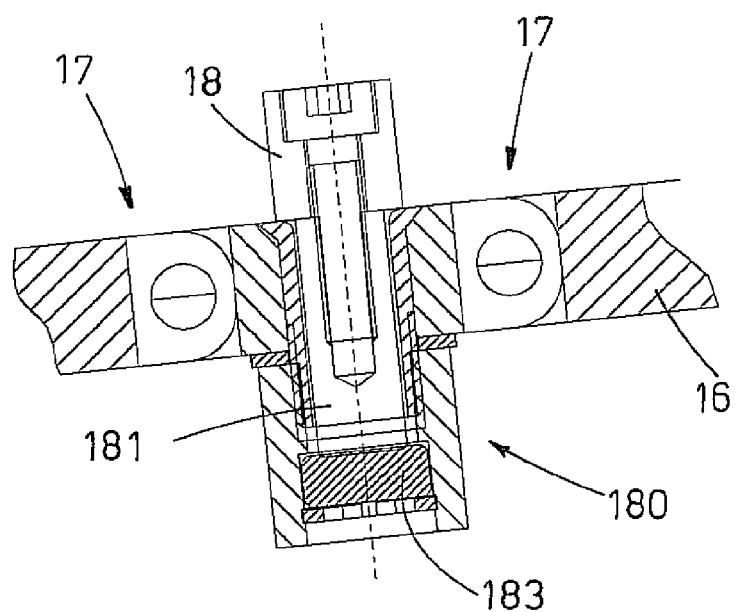
FIG. 4B is a similar view to that of FIG. 4A, with the shaped element inserted in the seating.

At the bottom of each niche 182 there is a magnet 183 which exerts, on the relative pin 181, a predetermined force of attraction, sufficient, together with the force exerted on the other pin 181 by the relative magnet 183, to keep the corresponding lath 18 solidly anchored to the belt 16 (FIGS. 4A, 4B).

Two consecutive branches 16 are defined in the conveyor belt, respectively the upper operating branch 16A and the lower return branch 16B (FIGS. 1 and 3), the first of which comprises, according to the advancement direction W:

an initial tract 160, substantially horizontal and arranged at an input station SI underlying the slit 110 in the hopper 11 and destined to restingly receive the articles 2 which exit therefrom;

an ascending tract 161, for unloading from each transversal seating 17 the articles 2 exceeding a maximum predetermined number as well as the articles arranged wrongly, and redirecting them to the input station S1, where they are held back;

an intermediate tract 162, ascending with a slight inclination such as to maintain the elongate articles 2 in a position resting against the posterior laths 18 of the relative seatings 17;

a final tract 163, substantially horizontal, situated at an unloading station S2 of the elongate articles 2.

Adjustment organs 164 are associated to the conveyor belt 16, which organs 164 vary the inclination of the ascending tract 161 from a minimum inclination a1 to a maximum inclination a2, according to the shape, the size and the type of elongate articles 2 which are treated, with the aim of optimizing the selection of the articles 2, ensuring that the transversal seatings 17 are as regularly filled as possible.

Figure 3A:
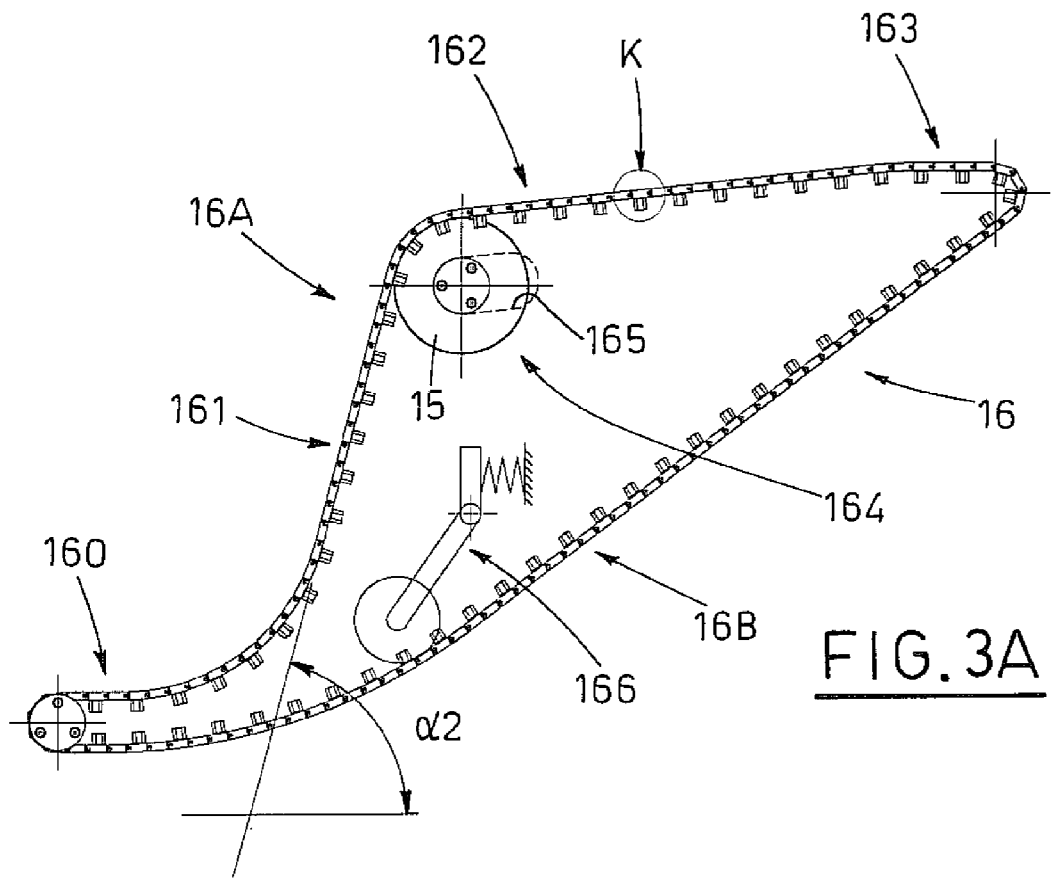
FIG. 3A illustrates, in lateral view, a conveyor belt of the device, without the transversal separator elements, in a first configuration of the trajectory.
Figure 3B:
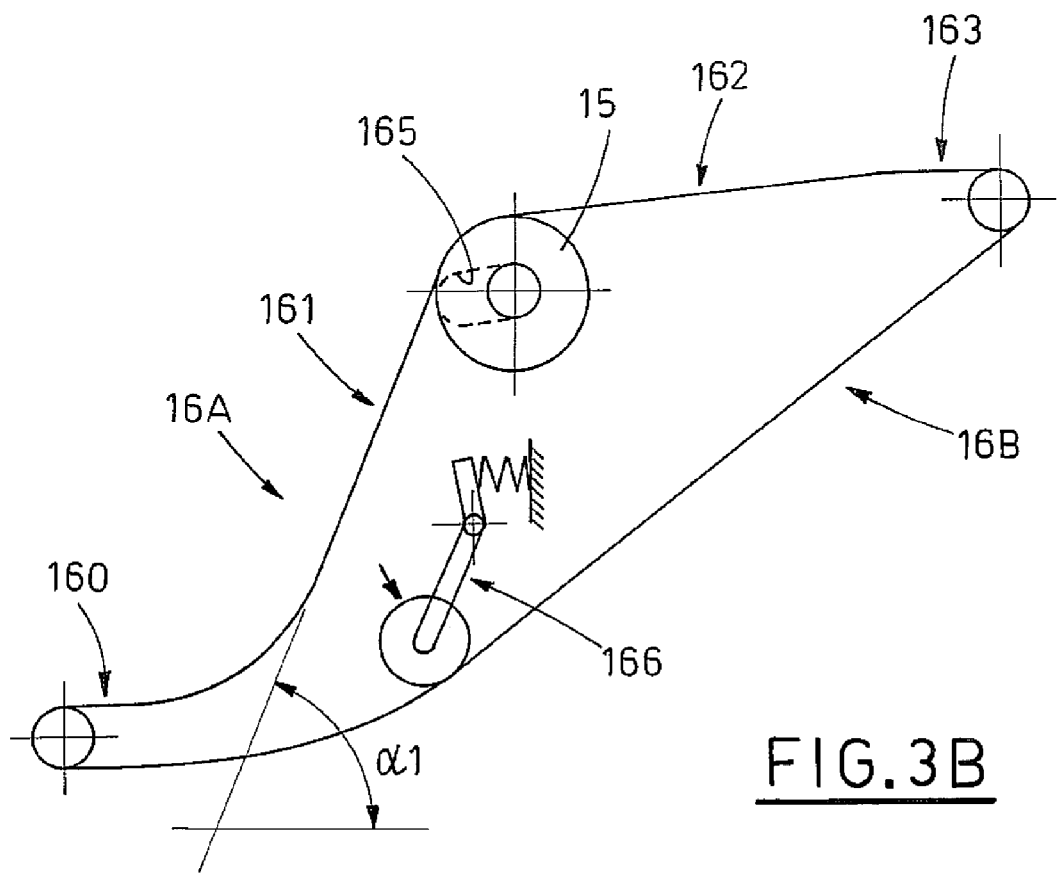
FIG. 3B is a similar view to that of FIG. 3A, though less detailed, with the belt in a second configuration of the trajectory.

The adjustment organs 164, in a possible embodiment thereof illustrated schematically in FIGS. 3A and 3B, comprise slotted flanges 165 for supporting the return roller 15 interposed between the ascending tract 161 and the intermediate tract 162, and stretcher means 166 for keeping the conveyor belt 16 taut.

The flanges 165 are fixed to the main body 10 such that the development direction of the relative slots is advantageously parallel to the inclination of the intermediate tract 162; for this reason, the displacement of the return pulley 15 causes a variation in the inclination of the ascending tract 161 from a maximum a2 (FIG. 3A) to a minimum a1 (FIG. 3B), maintaining however the inclination of the intermediate tract 162 intact.

The variation of inclination changes the path and development of the upper operating branch 16A, which is compensated for by the action of the stretcher means 166, of substantially known type, exerted on the lower return branch 16B (see FIGS. 3A, 3B once more).

Sensor organs 20 are present in the supply station S1, which sensor organs 20 detect a minimum load level of elongate objects 2, which have exited from the slot 110 and which have fallen onto the initial tract 160 of the belt 16; the sensor organs 20, on detecting an insufficient quantity of articles 2, provide the signal for enabling the intermittent activating of the conveyor belt 12, such that it extracts a further batch of articles 2.

Optical detecting organs 30 are located above the intermediate tract 162, for example a television camera (FIG. 1) for monitoring the transversal seatings 17 in transit, in order to detect either the presence or absence in each transversal seating 17 of elongate articles 2, and should there be any present, the number, position and orientation thereof.

In the real functioning condition of the device 1 illustrated in FIG. 5, the seatings 17 which arrive in the intermediate tract 162 and the successive final tract 163 can contain one or two elongate articles 2, with a random position and orientation, or they can be empty.

Above the final tract 163 of the operating branch 16A in the unloading station S2 there are robotic manipulating organs 40 (FIG. 1 and the insert of FIG. 5), controlled by the optical detection organs 30, which manipulating organs 40 grip at least one of the elongate articles 2 from each of the arriving full transversal seatings 17 on the basis of coordinates provided by the optical detecting organs 30, in order to transfer the at least one elongate article 2 into an output position downstream (not illustrated) with predetermined orientation.

The device 1 finally comprises means 50 for collecting elongate articles 2 not collected by the robotic manipulating organs 40 and unloaded from the conveyor belt 16 beyond the final tract 163 of the relative operating branch 16A.

Figure 2:
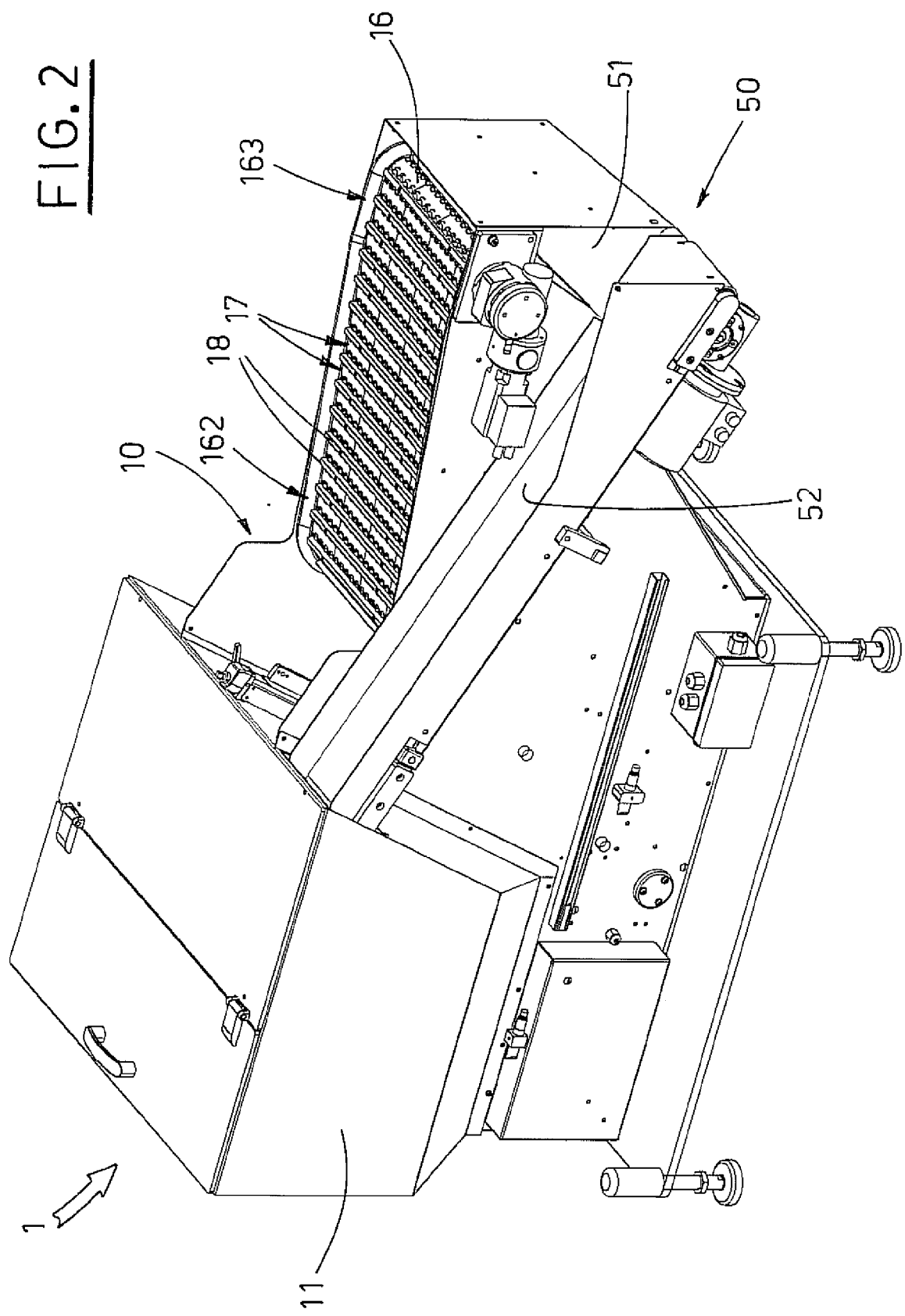
FIG. 2 is a perspective view of the main body of the device of FIG. 1.

In a preferred embodiment, the means for collecting 50 comprise a chute 51 which guides the unloaded elongate articles 2 from the conveyor belt 16 towards a return conveyor 52 for returning the elongate 2 to the inside of the hopper 11 (FIGS. 1 and 2).

In a simplified version of the device 1, not illustrated, the return conveyor 52 is not present and is replaced by a collection container which an operative periodically empties back into the hopper 11.

The peculiarities of the device clearly emerge from the above description, which fully satisfies the set aims, especially in that it ensures delivery to the downstream location of single elongate articles having a predetermined position and orientation.

This advantageous aspect, given by the conformation of the device, derives from the fact that it comprises a single conveyor element (the conveyor belt) instead of the two conveyors set in series in the prior art cited in the preamble hereto. As a consequence, once the ascending tract has been completed, the articles contained in each seating are not subjected to any displacement, so that the detection made by the vision camera is reliable, as is the consequent action of the robotic gripping organ.

The fact that the conveyor belt, though with some empty seatings, is able to supply, over a certain time period, an excessive number of elongate articles with respect to the number needed, ensures the continuity of supply to a machine provided downstream of the device.

The system of magnetic anchoring of the laths to the conveyor belt is of particular interest, as it guarantees an easy and rapid substitution thereof when container format is to be changed; in this regard it is of note that the laths are also the only element relating to a precise format present in the device.

Finally, the device of the invention is realizable with contained costs, thanks to the intrinsic constructional simplicity of its parts and the fact that some complex components (television camera and robot) are normally available commercially and are thus available at competitive costs, as well as being entirely reliable.

All of the above is intended purely by way of non-limiting example, so that any modifications to details dictated by particular technical and/or functional circumstances are to be considered as falling within the ambit of protection of the following claims.

What is claimed:

1. A device for individual conveying of elongate objects, which comprises: a hopper for loosely containing the elongate articles; means for picking-up located at a lower mouth of the hopper, for supporting a pile of the elongate articles as well as being step-activated in order to extract batches of the articles from the hopper; a conveyor belt, in which a plurality of specially-dimensioned transversal seatings are afforded, which conveyor belt is ring-wound to define two consecutive branches, respectively an operative upper branch and a return lower branch, the upper branch comprising an initial tract, substantially horizontal, arranged at an input station underlying the hopper and destined to restingly receive the articles which come from the hopper, an ascending tract, wherein each transversal seating conveys at least an elongate article, arranged in a predetermined orientation, and each seating does not retain the elongate articles exceeding a maximum number and any wrongly-arranged articles, which elongate articles exceeding a maximum number and the any wrongly article drop into the input station, an intermediate tract and a final tract, situated at an unloading station of the elongate articles; sensor organs located in the input station, for detecting a minimum load level of the elongate articles and for enabling the step-activation of the means for picking-up; optical detecting organs, arranged superiorly of the intermediate tract, for detecting in each of the transversal seatings a presence or absence of elongate articles and if a presence thereof has been detected, detecting a number, a position and an orientation of the elongate articles; robotic manipulating organs located at the unloading station above the final tract of the operative upper branch, controlled by the optical detecting organs, for picking-up from each full transversal seating in arrival at least one elongate article on a basis of coordinates provided by the optical detecting organs, in order to transfer the elongate article to an output position downstream, with a predetermined orientation; means for collecting the elongate articles not picked-up by the robotic manipulating organs and unloaded by the conveyor belt beyond the final tract of the operative upper branch.

2. The device of claim 1, wherein the means for picking-up are constituted by a conveyor belt which by means of a the step-motion thereof directs the elongate objects towards a slit realized laterally in the hopper, causing exit of the elongate articles from the hopper and a falling thereof towards the underlying initial tract of the conveyor belt.

3. The device of claim 1, wherein each of the transversal seatings lies in a space between two consecutive laths arranged transversally on the conveyor belt and removably associated thereto by rapid attachment means.

4. The device of claim 1, wherein a width of each of the transversal seatings, considered in a parallel direction to a development direction of the conveyor belt, is such as to enable the seating to house one only elongate article in the parallel direction.

5. The device of claim 3, wherein the rapid attachment means are constituted by at least two metal pins, parallel to one another and made solid to a lower side of each lath, the at least two metal pins being destined to insert in complementarily-shaped niches afforded in the conveyor belt and each of the niches being provided with a respective magnet arranged at a bottom of each of the niches, which magnet exerts a predetermined force of attraction on each respective pin of the pins, which force of attraction, together with the force of attraction on the other pin of the pins, determines an anchoring of the respective lath to the conveyor belt.

6. The device of claim 1, wherein it comprises adjustment organs associated to the conveyor belt which vary an inclination of the ascending tract by a minimum amount to a maximum amount according to a shape, dimensions and type of the elongate articles.

7. The device of claim 6, wherein the adjustment organs comprise slotted flanges for supporting a return pulley interposed between the ascending tract and the intermediate tract, and stretcher means for maintaining a tension of the conveyor belt.

8. The device of claim 7, wherein the flanges are fixed to the main body of the device such that the development direction of the slots is parallel to the inclination of the intermediate tract.

9. The device of claim 1, wherein the intermediate tract is ascending with a slight inclination, such as to maintain the elongate articles contactingly against the posterior walls of the relative seatings.

10. The device of claim 1, wherein the final tract is substantially horizontal.

11. The device of claim 1, wherein the optical detection organs are constituted by a vision camera.

12. The device of claim 1, wherein the means for collecting comprise a chute which guides the elongate articles unloaded from the conveyor belt towards a return conveyor provided to return the elongate articles internally of the hopper.

13. The device of claim 1, wherein the means for collecting comprise a chute for guiding the elongate articles unloaded from the conveyor belt towards a collection container.

* * * * *